US007872371B2

(12) United States Patent
Varley et al.

(10) Patent No.: US 7,872,371 B2
(45) Date of Patent: Jan. 18, 2011

(54) POWER LINE E-FIELD COUPLER AND ASSOCIATED SYSTEMS AND METHODS

(75) Inventors: Robert Fred Varley, Melbourne, FL (US); Roger Paul Maier, Indian Harbor Beach, FL (US)

(73) Assignee: Harris Corporation, Melbourne, FL (US)

( * ) Notice: Subject to any disclaimer, the term of this patent is extended or adjusted under 35 U.S.C. 154(b) by 141 days.

(21) Appl. No.: 12/404,440

(22) Filed: Mar. 16, 2009

(65) Prior Publication Data

US 2010/0231056 A1  Sep. 16, 2010

(51) Int. Cl.
*H02J 5/00* (2006.01)

(52) U.S. Cl. ............... 307/10.1; 307/145; 307/154; 702/57; 702/64

(58) Field of Classification Search ............ 307/10.1, 307/145, 154; 702/57, 64
See application file for complete search history.

(56) References Cited

U.S. PATENT DOCUMENTS

| 4,384,289 | A | * | 5/1983 | Stillwell et al. | 340/870.17 |
| 4,611,207 | A | * | 9/1986 | Anderson et al. | 340/870.16 |
| 4,799,005 | A | * | 1/1989 | Fernandes | 324/127 |
| 4,894,785 | A | * | 1/1990 | Fernandes | 702/57 |
| 5,301,096 | A | * | 4/1994 | Klontz et al. | 363/37 |
| 6,470,283 | B1 | * | 10/2002 | Edel | 702/64 |
| 6,646,859 | B2 | * | 11/2003 | Vahamaki et al. | 361/306.1 |
| 7,061,370 | B2 | | 6/2006 | Cern | 340/310.07 |
| 7,543,780 | B1 | * | 6/2009 | Marshall et al. | 244/194 |
| 7,633,262 | B2 | * | 12/2009 | Lindsey et al. | 320/108 |
| 2006/0114122 | A1 | | 6/2006 | Jones | 340/870.07 |
| 2008/0246507 | A1 | * | 10/2008 | Gunn et al. | 324/771 |

FOREIGN PATENT DOCUMENTS

WO   WO2004102757   11/2004

OTHER PUBLICATIONS

"Spy Planes to Recharge by Clinging to Power Lines", by Paul Marks, Dec. 18, 2007, 1 page, available at www.newscientist.com/article/dn13093-spy-planes-recharge-by-clinging-to-power-lines.

* cited by examiner

*Primary Examiner*—Jared J Fureman
*Assistant Examiner*—Adi Amrany
(74) *Attorney, Agent, or Firm*—Allen, Dyer, Doppelt, Milbrath & Gilchrist, P.A.

(57) ABSTRACT

The power line electric field (E-field) coupler device is for collecting energy from a power line and includes a flexible stack of alternating electrically conductive layers and dielectric layers. A power collecting circuit is connected to the flexible stack to output power therefrom based upon E-field coupling from the power line to the flexible stack, and an adjustment mechanism adjusts at least a shape of the flexible stack.

27 Claims, 6 Drawing Sheets

POWER LINE E-FIELD COUPLER AND ASSOCIATED SYSTEMS AND METHODS

FIELD OF THE INVENTION

The present invention relates to the field of power coupling and, more particularly, to power line couplers such as for unmanned vehicles and related methods.

BACKGROUND OF THE INVENTION

Collecting or harvesting energy from power lines, e.g. 60 Hz power lines, without making an electrical connection may be useful for distributed, remote sensors, such as robotic Intelligence Surveillance Reconnaissance (ISR) sensors and/or unmanned high voltage power line access vehicles. Such sensors and vehicles need energy supply to support extended and unattended deployment and operation.

Electromagnetic field couplers have been developed for power line access vehicles. Typically, such couplers couple the entire circular magnetic field path for significant energy coupling. They may use relatively heavy iron core inductive couplers. Also, a clamshell coupler structure and mechanism may be required so the coupler can be passed over an incline power line obstacle, such as a splice box.

There are extensive networks of electrical power lines suspended overhead. Periodic inspection of each and every power line may help ensure that the power lines are functioning correctly. Frequent inspections of power lines may be especially useful after strong weather, such as high winds or electrical storms.

Various attempts have been made to produce an inspection robot, which travels on wheels, rollers or tracks and which is supported by the overhead power lines. For example, U.S. Patent Application Publication No. 2006/0114122 is directed to a hovering power line inspection vehicle that includes an ohmic contact pantograph for contacting the power line to draw power therefrom.

It may be advantageous to be able to provide a power line coupler that does not require ohmic connection, and in which the coupler may draw power from the lines themselves, such that the operation range of a vehicle is not limited by any particular power source. It may be advantageous to provide a power line coupler for an inspection vehicle in which a power source (e.g. a battery) within the apparatus can be re-charged such that the vehicle may use the power source when continuous power from power lines is not available or efficient.

SUMMARY OF THE INVENTION

In view of the foregoing background, it is therefore an object of the present invention to provide a power line coupler for effectively collecting energy from a power line, such as without ohmic connection to the power line.

This and other objects, features, and advantages in accordance with the present invention are provided by an electric field (E-field) coupler device for collecting electrical power from an adjacent power line, the E-field coupler device including a flexible stack of alternating electrically conductive layers and dielectric layers. A power collecting circuit is connected to the flexible stack to output power therefrom based upon E-field coupling from the power line to the flexible stack, and an adjustment mechanism adjusts at least a shape of the flexible stack. The flexible stack may only partially surround the adjacent power line, which may provide advantages for connecting/disconnecting as well as traversing obstacles along the line.

The adjustment mechanism may further adjust a spacing of the flexible stack from the adjacent power line and/or the radius of curvature of the flexible stack. A control system may be included to control the adjustment mechanism, such as based upon output power from the collection circuit. Such a control system may include a fuzzy logic controller, for example.

The adjustment mechanism may include a flexible base mounting the flexible stack, and a plurality of linear actuators coupled to the flexible base. The flexible base may comprise a series of interconnected segments with a respective hinge between adjacent ones of the interconnected segments. A respective ball joint may be between corresponding segments and linear actuators. The electrically conductive layers may be aluminum or copper foil sheets, for example. The power collecting circuit may include a rectifier circuit and a DC-to-DC converter associated therewith.

Another aspect is directed to a power line access vehicle including a vehicle body and an electric field (E-field) coupler device carried by the vehicle body for collecting electrical power from an adjacent power line. The E-field coupler device may include a flexible stack of alternating electrically conductive layers and dielectric layers. A power collecting circuit is connected to the flexible stack to output power therefrom based upon E-field coupling from the power line to the flexible stack, and an adjustment mechanism adjusts at least a shape of the flexible stack.

A battery may be carried by the vehicle body, and the power collecting circuit may include a rectifier circuit and an associated DC-to-DC converter connected to the battery. Also, a drive mechanism may be carried by the vehicle body to contact the power line and move the vehicle along the power line. Alternatively, a flying mechanism may be carried by the vehicle body.

A method aspect is for collecting energy from a power line. The method includes providing a flexible stack of alternating electrically conductive layers and dielectric layers, and using a power collecting circuit connected to the flexible stack to output coupled electrical power. The method may include adjusting at least a shape of the flexible stack based upon output power from the power collecting circuit. Such adjusting may include adjusting a spacing of the flexible stack from the adjacent power line and/or adjusting the radius of curvature of the flexible stack.

DETAILED DESCRIPTION OF THE PREFERRED EMBODIMENTS

Figure 1:
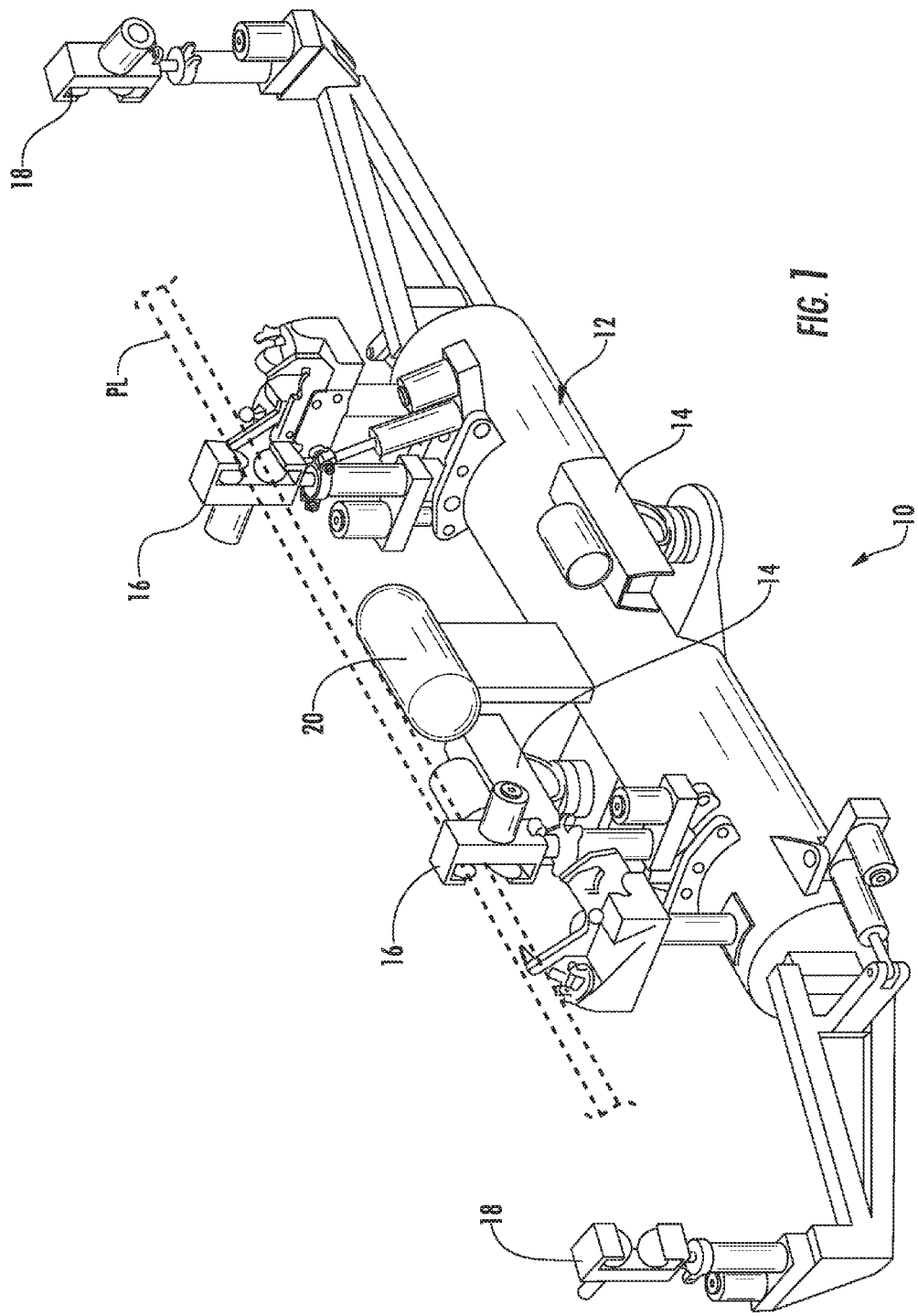
FIG. 1 is a perspective view of a power line inspection vehicle including an E-field coupler device in accordance with features of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a power line coupler 20, or electric field (E-field) coupler device, for collecting energy from a power line PL will be described. The E-field coupler device 20 may be used, for example, in connection with a high voltage power line access and/or inspection vehicle 10, and may allow such vehicle to more easily pass around in-line obstacles because in some advantageous embodiments the E-field coupler does not completely encircle the power line. Such a power line access and/or inspection vehicle 10 illustratively includes a vehicle body 12, inspection cameras 14 carried by the body, and also drive mechanisms 16 and passing mechanisms 18.

The drive mechanisms 16 may be carried by the vehicle body 12 to contact the power line PL and move the vehicle along the power line. Alternatively or additionally, a flying mechanism, not shown, may be carried by the vehicle body 12. The flying mechanism may include wings and one or more electrically driven propellers, for example. The E-field coupler device 20 may also, for example, be used in connection with robotic Intelligence Surveillance Reconnaissance (ISR) sensors.

The E-field coupler device 20 is for collecting electrical power via the radiating E-field from an adjacent power line PL, and the E-field coupler device includes a flexible stack 22 of alternating electrically conductive layers 24 and dielectric layers 26. For example, the dielectric layers 26 may be a flexible dielectric material having a high dielectric constant, e.g. k=3 and higher, and a high breakdown voltage. Within the stack 22, between the dielectric layers 26, are very thin layers 24 of conductive foil sheets, such as copper or aluminum.

Electromagnetic fields (EMFs) include both electric fields EF and magnetic fields MF. The frequency of a power line is determined by the rate at which electric and magnetic fields change their direction each second. For power lines in the United States, the frequency of change is 60 times per second and is defined as 60 Hertz (Hz) power. In Europe and many other countries, the frequency of electric power is 50 Hz.

The apparent power flowing in a power line is determined by the power line's voltage and the current. The higher the voltage level of the power line, the lower the amount of current needed to deliver the same amount of power. For example, a 115 kV transmission line with 200 amps of current will transmit approximately 40,000 kilowatts (kW), and a 230 kV transmission line requires only 100 amps of current to deliver the same 40,000 kW. Electric fields EF from power lines are created whenever the lines are energized, with the strength of the field being dependent directly on the voltage of the line creating it. Electric field strength is typically described in terms of kilovolts per meter (kV/m). Electric field strength attenuates (reduces) rapidly as the distance from the source increases. Unlike magnetic fields, which penetrate almost everything and are unaffected by buildings, trees, and other obstacles, electric fields are distorted by any object that is within the electric field.

Figure 2:
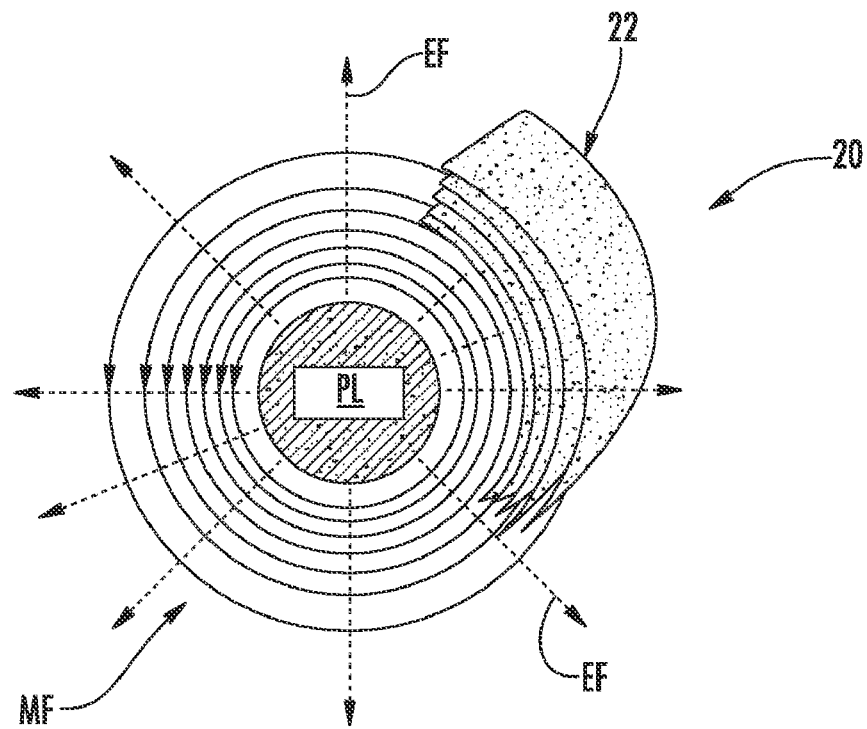
FIG. 2 is a schematic diagram of the E-field coupler device stack as in FIG. 1 in relation to the electric and magnetic fields radiating from a power line.
Figure 3:
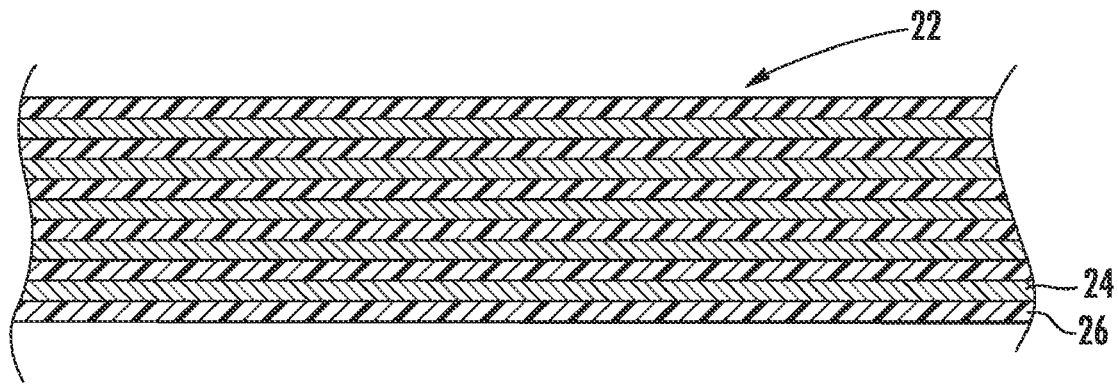
FIG. 3 is a cross-sectional view of the stack of layers of the E-field coupler device as in FIG. 2.

Referring more specifically to FIG. 2, since the E-field EF energy radiates in all directions from the power line PL, efficient power coupling can be provided without encircling the power line as is typically required for magnetic field power coupling which uses high permeability, high density iron plates. The voltage across the stack 22 of layers in the E-field coupler device 20 is determined by electric field intensity, stack thickness and the stack's radial distance from the power line PL.

Increasing the number of conductive layers 24, e.g. 100+, and the relative compactness results in better power coupling. Coupling efficiency is enhanced or maximized when the conductive layers 24 are orthogonal to the E-field strength lines. Also, when the conductive layers 24 deviate from orthogonal, voltage gradients and intra-layer circulation currents may be created and result in subsequent over heating of the stack 22.

Figure 4:
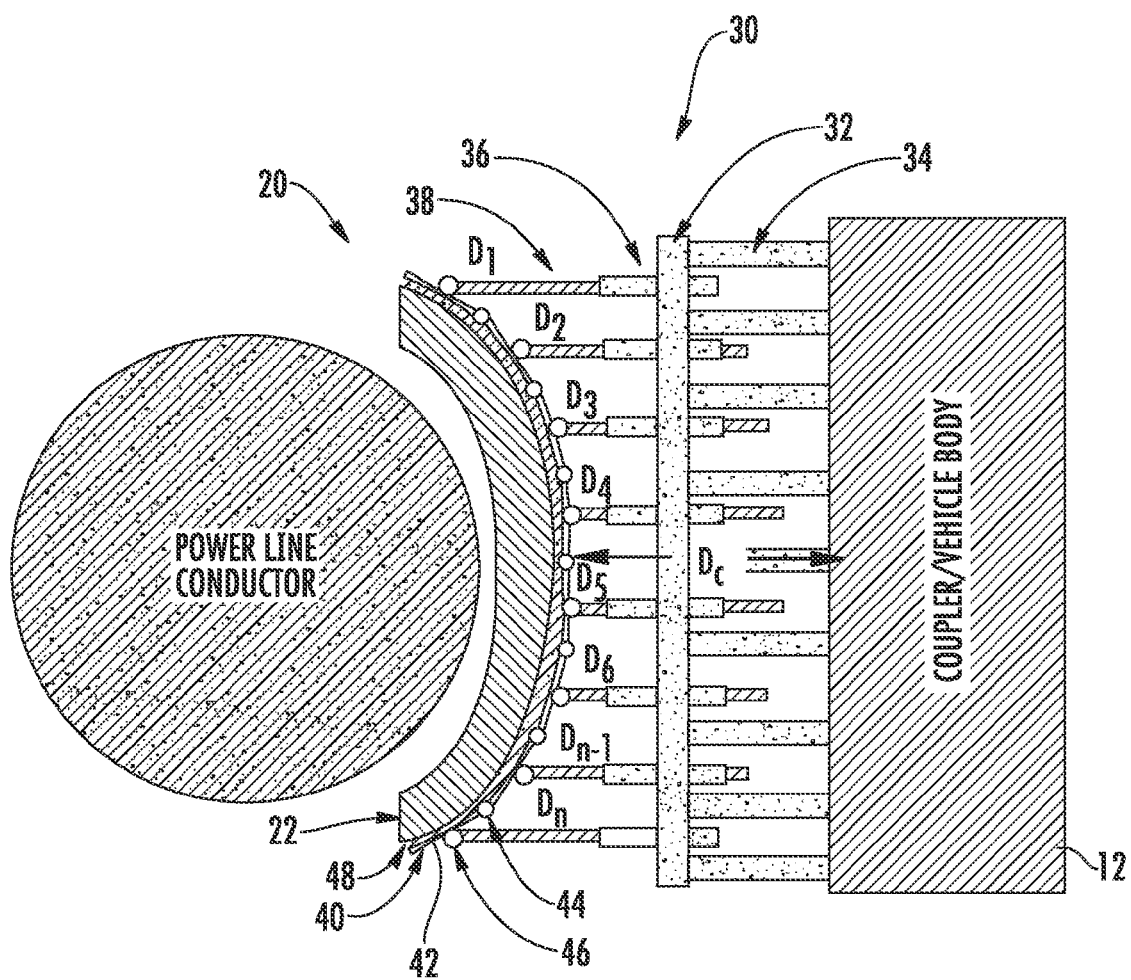
FIG. 4 is a schematic diagram illustrating an embodiment of an adjustment mechanism for the E-field coupler device as in FIG. 2.

Accordingly, referring more specifically to FIG. 4, an adjustment mechanism 30 may be provided to adjust at least a shape of the flexible stack 22. The adjustment mechanism 30 may further adjust the spacing or distance of the flexible stack 22 from the adjacent power line PL and/or the radius of curvature of the flexible stack 22. Illustratively, such an adjustment mechanism 30 may include a backbone 32 attached to the vehicle body 12 via rigid standoffs 34. Mounting members 36 are carried by the backbone 32 and are respectively associated with a plurality of linear actuators 38 (e.g. D1-Dn).

The adjustment mechanism 30 may include a flexible base 40 mounting the flexible stack 22, and the plurality of linear actuators 38 are coupled to the flexible base. The flexible base 40 may include a series of interconnected segments 42 with a respective hinge 44 between adjacent ones of the interconnected segments. A respective ball joint 46 may be between corresponding segments 42 and linear actuators 38.

Thus, the adjustment mechanism 30 may implement an approach to control the E-Field coupler device 20 shape and positioning under a control scheme to maximize coupler output voltage and output power. The segments 42 or slat members are longitudinally oriented with respect to the power line PL and actuated with respect to the coupler/vehicle body 12 by the linear actuators 38 (e.g. powered lead screws). One-dimensional confined movement between adjacent segments 42 is provided via the hinges 44 (e.g. piano-type hinges) to allow only angular motion between adjacent segment longitudinal edges. Confined movement between each segment 42 and its respective linear actuator 38 is provided by way the ball joint 46 to allow actuator attitude to remain fixed with respect the backbone assembly 32 as actuator length changes. The ball joints 46 allow the attachment angle between each segment 42 and its respective actuator 38 to change as the actuator length changes.

Coupler device 20 location or distance (Dc) with respect to the power line PL and the vehicle body 12 is controlled by changing all linear actuator lengths the same distance and direction. Coupler device 20 shape (e.g. radius of curvature) is changed by differentially changing linear actuators lengths. Individual actuator lengths may be determined by a control system's closed loop control method to enhance or maximize sensed output voltage and power, as will be discussed in detail below.

A flexible, low conductivity material or substrate 48 illustratively isolates the coupler's electrical collection element surfaces from the mechanism's adjustable segments 42. The flexible substrate 48 also serves to smooth the transition from the flat segments 42 into a more contoured surface to provide a near-circular coupler collection shape with respect to the power line PL circumference.

Figure 5:
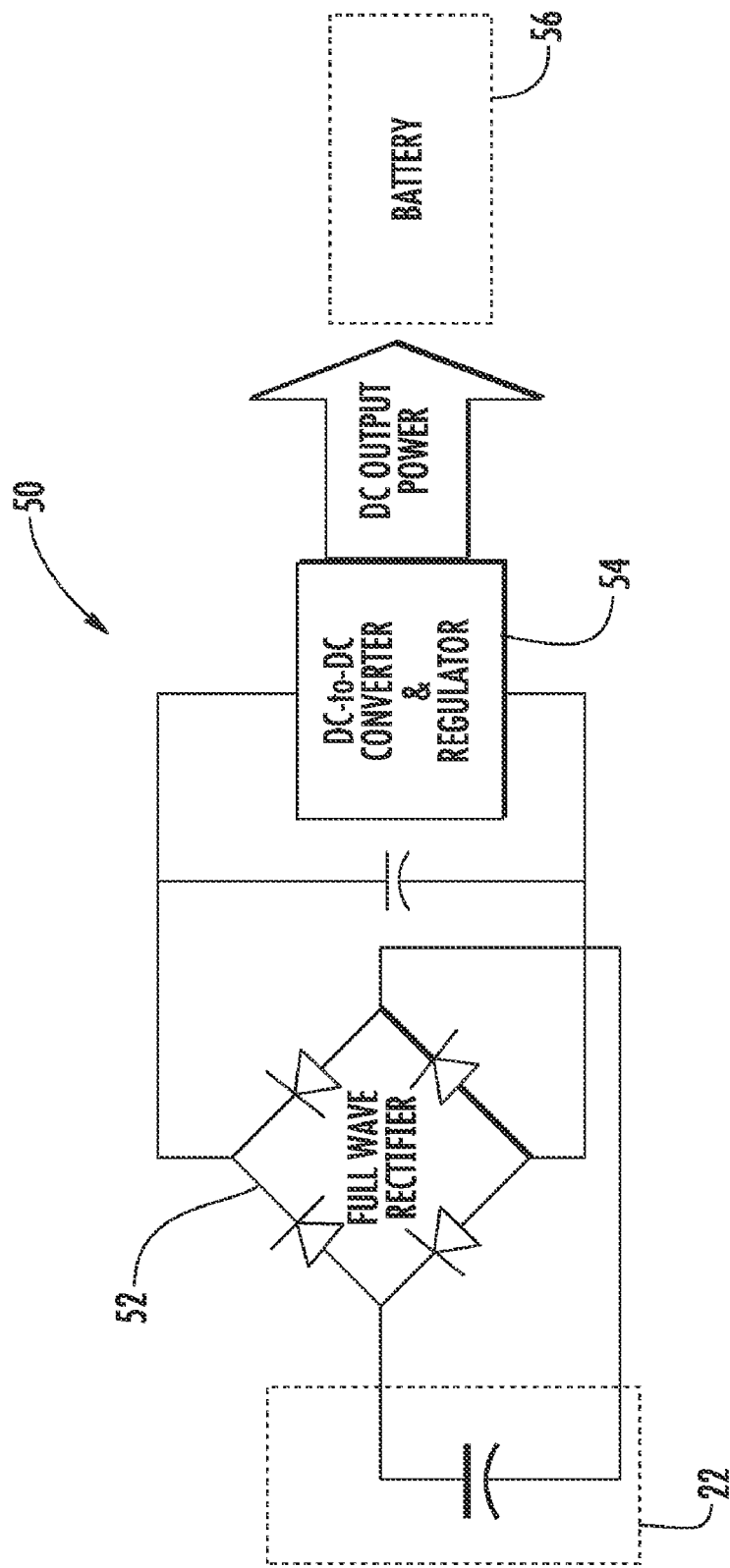
FIG. 5 is a schematic diagram illustrating a power collection circuit for the E-field coupler device as in FIG. 2.

Referring now additionally to FIG. 5, a power collecting circuit 50 may be connected to the flexible stack 22 to output power therefrom based upon E-field coupling from the power line PL to the flexible stack. The power collecting circuit may include a rectifier circuit 52 and a DC-to-DC converter 54 associated therewith. A battery 56 may also be carried by the vehicle body 12 to be charged from the power collecting circuit 52.

Figure 6:
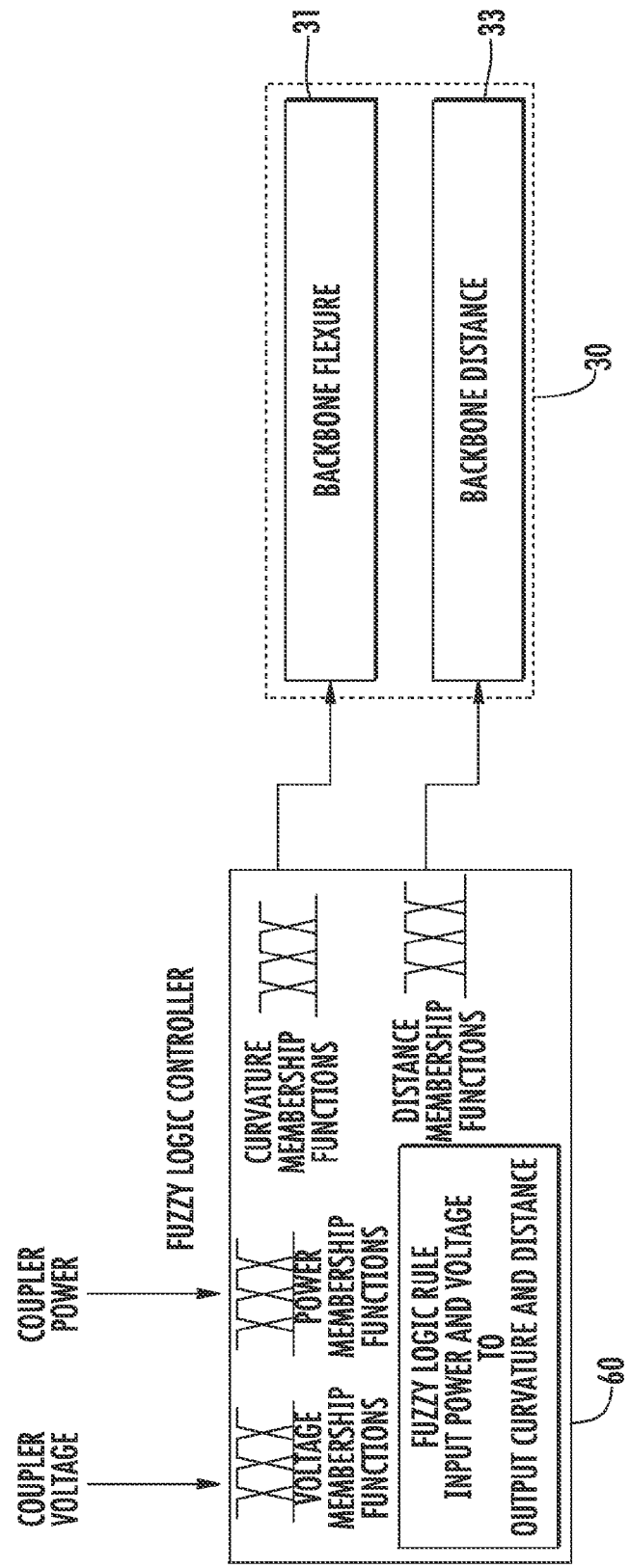
FIG. 6 is a block diagram of a control system for the E-field coupler device as in FIG. 2.

Referring now additionally to FIG. 6, a control system 60 may be included to control the adjustment mechanism 30 based upon output power from the collection circuit 50. Such a control system 60 may be a fuzzy logic controller including a fuzzy logic knowledge base that relates input power and voltage to control output curvature and distance in accordance with sensed couple power and voltage input membership functions, and coupler mechanism shape and distance output membership functions. An expert system rule base correlates input membership functions to output membership functions as will be appreciated by those skilled in the art.

Figure 7:
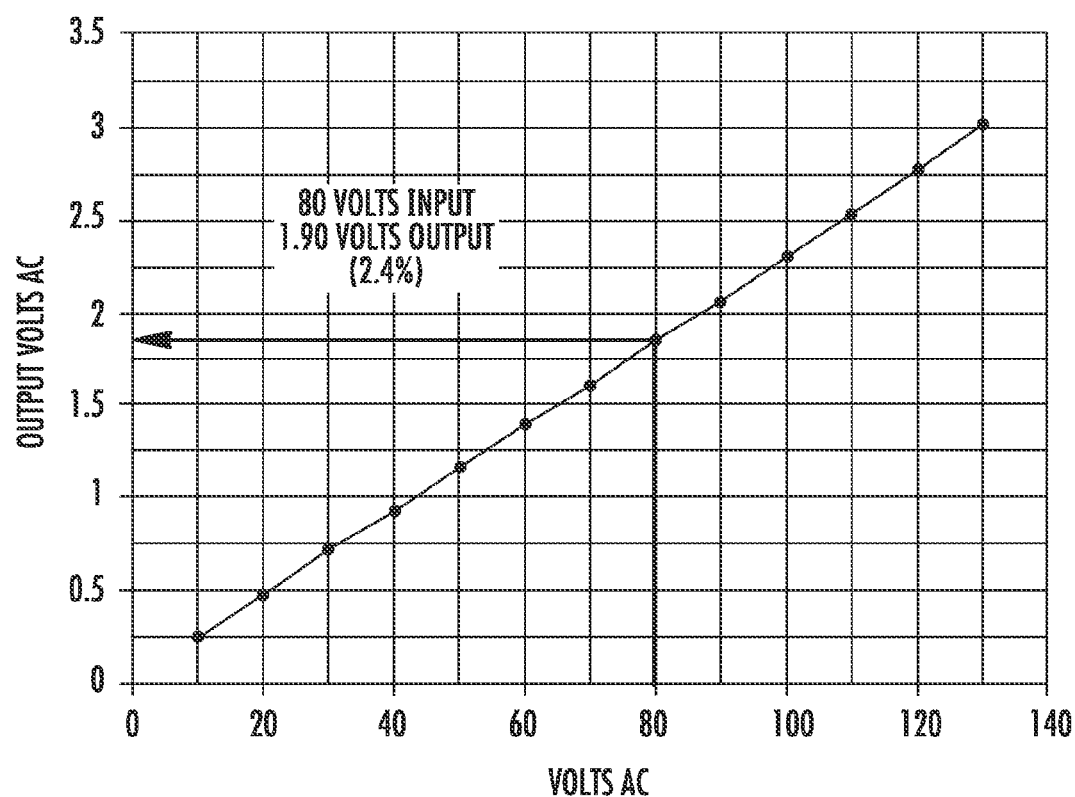
FIG. 7 is a graph illustrating input voltage versus output voltage for a simulation of the power coupling approach of the present invention.

A model was developed to test and demonstrate the E-field coupling approach of the present invention. A stack of aluminum foil layers with interlaced dielectric layers had a stack height of 7/16 of an inch, and was placed adjacent a simulated power line of half inch diameter copper pipe. A variable voltage AC power source applied a controlled voltage to the pipe and the input versus output voltage was measured as reflected in the graph of FIG. 7. It is noted that the coupler output voltage is a function of the power line voltage and not the power line current.

An example of an E-field coupler device 20 in accordance with features of the present invention may include a coupler stack having a radial thickness of 2 inches, circumferential stack width of 4 inches, stack length of 30 inches, stack capacitance of 10 microfarads and a coupler impedance of 265 ohms. A 250 KV power line at 30 meters high may provide about a 423 volt notional coupler voltage for a E-field coupler device 20 output power of 300 watts.

A method aspect of the present invention is for collecting energy from a power line PL. The method includes providing a flexible stack 22 of alternating electrically conductive layers 24 and dielectric layers 26, and using a power collecting circuit 50 connected to the flexible stack to output power therefrom based upon E-field coupling from the power line to the flexible stack. The method includes adjusting at least a shape of the flexible stack 22 based upon output power from the power collecting circuit 50. The adjusting may include adjusting a spacing of the flexible stack 22 from the adjacent power line PL and/or adjusting the radius of curvature of the flexible stack.

Thus, the present approach results in power line coupling for efficiently collecting energy from a power line, and while more easily passing around in-line obstacles and without having to encircle or make ohmic connection with the power line.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electric field (E-field) coupler device for collecting electrical power from an adjacent power line, the E-field coupler device comprising:

a flexible stack of alternating electrically conductive layers and dielectric layers;

a power collecting circuit connected to the flexible stack to output power therefrom based upon E-field coupling from the power line to the flexible stack; and an adjustment mechanism to adjust at least a shape of the flexible stack.

2. The E-field coupler device according to claim 1, wherein said flexible stack only partially surrounds the adjacent power line when positioned adjacent thereto.

3. The E-field coupler device according to claim 1, wherein the adjustment mechanism further adjusts a spacing of the flexible stack from the adjacent power line.

4. The E-field coupler device according to claim 3, wherein the adjustment mechanism adjusts the radius of curvature of the flexible stack.

5. The E-field coupler device according to claim 1, further comprising a control system to control the adjustment mechanism based upon output power from the power collecting circuit.

6. The E-field coupler device according to claim 5, wherein the control system comprises a fuzzy logic controller.

7. The E-field coupler device according to claim 1, wherein the adjustment mechanism comprises:

a flexible base mounting the flexible stack; and a plurality of linear actuators coupled to said flexible base.

8. The E-field coupler device according to claim 7, wherein said flexible base comprises a series of interconnected segments.

9. The E-field coupler device according to claim 8, wherein said flexible base further comprises a respective hinge between adjacent ones of said interconnected segments.

10. The E-field coupler device according to claim 9, wherein said adjustment mechanism further comprises a respective ball joint between corresponding segments and linear actuators.

11. The E-field coupler device according to claim 1, wherein the electrically conductive layers comprise at least one of aluminum and copper foil sheets.

12. The E-field coupler device according to claim 1, wherein the power collecting circuit comprises a rectifier circuit and a DC-to-DC converter associated therewith.

13. A power line access vehicle comprising:

a vehicle body; and an electric field (E-field) coupler device carried by the vehicle body for collecting electrical power from an adjacent power line, the E-field coupler device including a flexible stack of alternating electrically conductive layers and dielectric layers, a power collecting circuit connected to the flexible stack to output power therefrom based upon E-field coupling from the power line to the flexible stack, and an adjustment mechanism to adjust at least a shape of the flexible stack.

14. The power line access vehicle according to claim 13, wherein said flexible stack only partially surrounds the power line when the E-field coupler device is positioned adjacent thereto.

15. The power line access vehicle according to claim 13, further comprising a battery carried by the vehicle body; wherein the power collecting circuit of the E-field coupler device comprises a rectifier circuit and an associated DC-to-DC converter connected to the battery.

16. The power line access vehicle according to claim 13, further comprising a drive mechanism carried by the vehicle body to contact the power line and move the vehicle along the power line.

17. The power line access vehicle according to claim 13, further comprising a flying mechanism carried by the vehicle body.

18. The power line access vehicle according to claim 13, wherein the adjustment mechanism of the E-field coupler device adjusts the radius of curvature of the flexible stack, and further adjusts a spacing of the flexible stack from the adjacent power line.

19. The power line access vehicle according to claim 13, wherein the E-field coupler device further comprises a control system to control the adjustment mechanism based upon output power from the power collecting circuit.

20. The power line access vehicle according to claim 13, wherein the adjustment mechanism of the E-field coupler device comprises:
a flexible base mounting the flexible stack; and
a plurality of linear actuators coupled to said flexible base.

21. A method of collecting energy from a power line comprising:
providing a flexible stack of alternating electrically conductive layers and dielectric layers;
using a power collecting circuit connected to the flexible stack to output power therefrom based upon E-field coupling from the power line to the flexible stack; and
adjusting at least a shape of the flexible stack.

22. The method according to claim 21, wherein the flexible stack only partially surrounds the power line when the E-field coupler device is positioned adjacent thereto.

23. The method according to claim 21, wherein the adjusting further comprises adjusting a spacing of the flexible stack from the adjacent power line.

24. The method according to claim 23, wherein the adjusting further comprises adjusting the radius of curvature of the flexible stack.

25. The method according to claim 21, wherein the shape of the flexible stack is adjusted with an adjustment mechanism comprising a flexible base mounting the flexible stack, and a plurality of linear actuators coupled to the flexible base.

26. The method according to claim 25, wherein the flexible base comprises a series of interconnected segments and a respective hinge between adjacent ones of the interconnected segments; and wherein the adjustment mechanism further comprises a respective ball joint between corresponding segments and linear actuators.

27. The method according to claim 21, wherein the power collecting circuit comprises a rectifier circuit and an associated DC-to-DC converter.

* * * * *